(12) United States Patent
Basu et al.

(10) Patent No.: US 8,241,603 B1
(45) Date of Patent: Aug. 14, 2012

(54) PROCESS AND SYSTEM FOR REMOVING SULFUR FROM SULFUR-CONTAINING GASEOUS STREAMS

(75) Inventors: Arunabha Basu, Aurora, IL (US);
Howard S. Meyer, Hoffman Estates, IL (US); Scott Lynn, Pleasant Hill, CA (US); Dennis Leppin, Chicago, IL (US); James R. Wangerow, Medinah, IL (US)

(73) Assignee: Gas Technology Institute, Des Plaines, IL (US)

( * ) Notice: Subject to any disclaimer, the term of this patent is extended or adjusted under 35 U.S.C. 154(b) by 24 days.

(21) Appl. No.: 13/053,551

(22) Filed: Mar. 22, 2011

(51) Int. Cl.
*B01D 53/74* (2006.01)
*C01B 17/04* (2006.01)

(52) U.S. Cl. ............. 423/573.1; 423/574.1; 422/168; 422/169; 422/170

(58) Field of Classification Search ............. 423/573.1, 423/574.1; 422/168, 169, 170
See application file for complete search history.

(56) References Cited

U.S. PATENT DOCUMENTS

| | | | |
|---|---|---|---|
| 5,928,620 A | 7/1999 | Lynn | |
| 6,495,117 B1 | 12/2002 | Lynn | |
| 6,645,459 B2 | 11/2003 | Lynn | |
| 7,381,393 B2 | 6/2008 | Lynn | |
| 7,811,544 B1 * | 10/2010 | Leppin et al. | ............. 423/573.1 |

* cited by examiner

*Primary Examiner* — Timothy Vanoy
(74) *Attorney, Agent, or Firm* — Mark E. Fejer

(57) ABSTRACT

A multi-stage UCSRP process and system for removal of sulfur from a gaseous stream in which the gaseous stream, which contains a first amount of $H_2S$, is provided to a first stage UCSRP reactor vessel operating in an excess $SO_2$ mode at a first amount of $SO_2$, producing an effluent gas having a reduced amount of $SO_2$, and in which the effluent gas is provided to a second stage UCSRP reactor vessel operating in an excess $H_2S$ mode, producing a product gas having an amount of $H_2S$ less than said first amount of $H_2S$.

18 Claims, 2 Drawing Sheets

PROCESS AND SYSTEM FOR REMOVING SULFUR FROM SULFUR-CONTAINING GASEOUS STREAMS

The U.S. Government has a paid-up license in this invention and the right in limited circumstances to require the patent owner to license others on reasonable terms as provided for by the terms of Contract No. DE-FC26-05NT42458 awarded by the U.S. Department of Energy.

BACKGROUND OF THE INVENTION

1. Field of the Invention

This invention relates to a process and system for reducing the sulfur content of sulfur-containing gaseous streams. In one aspect, this invention relates to the treatment of gaseous streams produced by gasification and combustion processes. In one aspect, this invention relates to the use of the basic UCSRP process for removal of sulfur from gaseous streams. In one aspect, this invention relates to the treatment of sulfur-containing gaseous streams to achieve ultra-low sulfur levels therein.

2. Description of Related Art

Conventional technology for removing $H_2S$ from natural gas and hydrocarbon process gas streams is to contact the process gas stream in a suitable mass transfer contacting device, usually a vessel fitted out with packing or contactor trays, for example, valve trays, with a chemical solvent, such as an amine solution at a specified strength of amine in water, usually 50% or less amine by weight, but dependent on the specific amine employed or a specific solvent. Such amines absorb acidic gases, $CO_2$, and $H_2S$, and similar acidic components, although the first two are the acidic components usually found in significant concentrations, and form a chemically bonded solution referred to as a rich or loaded amine. The rich or loaded amine is sent to be "stripped" or regenerated, sometimes by the application of heat from direct injection of steam into a second, separate amine contactor often referred to as the regenerator, stripper, or reboiler, but also by indirectly heating the rich solution in the reboiler located at the bottom of the stripper. Inert gases or gases not containing acidic components, such as nitrogen, may also be added to such strippers to promote the dissociation of the chemically bonded acidic components or allow the reactions to occur at lower temperatures. Vacuum may also be applied. After sufficient exposure to the vapor stream in the stripper, the now lean solution is cooled, usually by cross exchange with the feed to the stripper, so as to minimize the required heat duty of the overall system. The lean amine is then returned to the absorber.

The off-gases from the stripper are sent to a sulfur recovery unit, most often a Claus plant in which some of the gas is burned with air to create approximately 2:1 $H_2S/SO_2$ ratio in the gas at a temperature above 2500° F., resulting in the reaction $$2H_2S+SO_2=3S+2H_2O \tag{1}$$

occurring in the gas phase. The gas is then cooled, resulting in separation of up to about 70% of the sulfur in the feed as liquid elemental sulfur in the liquid phase. The gas is reheated and passed over a catalyst at 600° F. or thereabouts, resulting in the formation of additional elemental sulfur. The gas is then cooled again, resulting in further elemental sulfur recovery. This is repeated in a total of 2 to 4 such catalytic Claus reactors until about 97% of the sulfur has been removed. Further removal is limited by equilibrium and if additional sulfur needs to be removed, all of the sulfur-containing compounds may be converted to $H_2S$ over a catalyst. The $H_2S$ so formed is then separated from the gas with a second absorber/stripper and recycled to the Claus process. By such means, in excess of 99% of the sulfur can be recovered.

The steps subsequent to the Claus reactors and condensers are referred to as off-gas treating processes and "tail gas" treating processes. Various enhancements to these processes exist to achieve even higher recoveries when required. For smaller tonnages of sulfur in the feed gas, about 20 tons per day or less, liquid redox processes such as LO-CAT or STRETFORD®, or the CRYSTASULF® process, may instead be employed more economically. For even smaller tonnages on the order of 100 lbs/day or less, absorbent beds of iron containing materials or caustic impregnated carbon or zinc oxide, or liquid filled beds of triazine "scavengers" or other chemicals or caustic may be used at lower system cost than the liquid redox type processes.

Similarly, based on Hysys simulation data using DGM as the solvent to remove $H_2S$ from this specific feed gas (shown in Table 1), the product gas would contain about 60 ppmv $SO_2$ if the reactor was operated at about 750 psia and a temperature of about 270° F. in an excess $SO_2$ mode with about 2% excess $SO_2$ (based on the total inlet stoichiometric $SO_2$ requirement) in the effluent gas. If the $SO_2$ level would have to be reduced to below 50 ppbv for specific downstream processing applications, it again would be necessary to add extra absorber/stripper operations using DGM or DEG solvents to further reduce the $SO_2$ levels to below 5-10 ppmv, and to add extra units that use specific adsorbents, such as a slurry of alkaline sorbent (e.g., limestone or lime) or dry sodium bicarbonate, or an aqueous sodium hydroxide solution which are typically used commercially to treat the product gas for further reducing the $SO_2$ level to below 50 ppbv. For large-scale commercial applications for gaseous streams containing relatively large levels of $CO_2$, the net expense for the use of such adsorbents (that would react with $SO_2$ as well as with $CO_2$) would be relatively very high to achieve a $SO_2$ specification of 50 ppbv or less.

The UCSRP (University of California Sulfur Recovery Process) concept for the removal of sulfur from natural gas and various gaseous streams is described in U.S. Pat. No. 7,381,393. In the UCSRP, hydrogen sulfide ($H_2S$) is reacted with sulfur dioxide ($SO_2$) to form sulfur in the presence of an organic liquid or solvent, preferably at temperatures above the melting point of sulfur in accordance with reaction (1). Typical solvents that may be used to facilitate this reaction include diethylene glycol methyl ether (DGM) or diethylene glycol (DEG) with a homogeneous catalyst such as 3-pyridyl methanol, collectively referred to as the "Solvent". As portions of the feed $H_2S$ and $SO_2$ dissolve in the solvent, they react to form sulfur which is essentially insoluble in the Solvent. Thus, the liquid sulfur product may be separated from the Solvent/gas mixture at the reactor outlet. U.S. Pat. No. 7,381,393 further teaches that the system may be operated in two modes—excess $H_2S$ mode or excess $SO_2$ mode. In the excess $H_2S$ mode, $H_2S$ is present in stoichiometric excess (at about 5-20% excess relative to the $SO_2$ fed to the reactor) for driving the reaction to completion with extinction of the $SO_2$ resulting in a product gas containing some $H_2S$. Similarly, in the excess $SO_2$ mode, $SO_2$ is present in stoichiometric excess resulting in a product gas containing some residual $SO_2$ depending on the extent of excess $SO_2$ used and the overall reaction kinetics. In the excess $H_2S$ mode, the solvent recirculation rate for the absorber/reactor is relatively much higher than in the excess $SO_2$ mode because the solubility of $H_2S$ in DGM-type solvents is significantly lower than that of $SO_2$.

The key problem of operation of the UCSRP in the excess $SO_2$ mode for all reactor stages, especially for $H_2S$-laden gaseous streams that contain relatively high levels of $CO_2$, is the downstream removal of the residual $SO_2$ to ultra-low levels, defined herein as less than about 50 ppbv, which is required for various processes for the production of key chemicals and liquid/gaseous fuels and other processes requiring ultra low levels of $SO_2$ in the cleaned gas.

An example of the operation of an $H_2S$-rich UCSRP-type absorber/reactor column is based on Hysys® simulation data using DGM as the solvent to remove $H_2S$ from a specific feed gas composition (containing about 6200 ppmv $H_2S$) shown in Table 1. The product gas at the outlet of a UCSRP-type absorber/reactor would contain about 120 ppmv $H_2S$ if the reactor was operated (at about 750 psia and 270° F.) in the excess $H_2S$ mode with about 2% excess $H_2S$ (based on the total inlet $H_2S$). If an $H_2S$ level below 50 ppbv were required for specific downstream processing applications (e.g., conversion of coal-derived syngas to chemicals or liquid fuels), it would be necessary to use either additional UCSRP absorber/reactors operating in the excess $H_2S$ mode or another sulfur removal technology (e.g., the CRYSTASULF process) to reduce the $H_2S$ level further to about 5-10 ppmv, both of which options add significant capital and operating costs to the process, followed by use of a guard-bed (e.g., ZnO based) to reduce the $H_2S$ level from 5-10 ppmv to below 50 ppbv. For typical large-scale commercial operations, such as the processing of coal-derived syngas for the production of clean liquid fuels, the operating expense for the guard-bed adsorbent would be quite prohibitive if the $H_2S$ level after the second processing step (e.g., the use of the CRYSTASULF process) is higher than 10 s of ppmv.

TABLE 1

Typical Composition of Coal-Derived Syngas After Sour Shift and Water Removal

|  | Mol % |
| --- | --- |
| $CH_4$ | 0.08 |
| CO | 1.16 |
| $CO_2$ | 40.11 |
| $H_2$ | 55.46 |
| $H_2S$ | 0.62 |
| $N_2$ | 0.75 |
| $H_2O$ | 1.02 |
| $NH_3$ | 0.14 |
| Ar | 0.66 |
| Total | 100.00 |

In a typical integrated gasification combined cycle (MCC) process, a low-value fuel such as coal, petroleum coke, biomass or municipal waste is converted to a high-hydrogen synthesis gas (syngas) by gasification. The syngas is then used as the primary fuel for a gas turbine. However, the syngas from the gasification process contains a number of impurities, including sulfurous compounds such as $H_2S$, which must be removed before the syngas can be burned in the gas turbine. One existing approach is to use SELEXOL® or a similar physical solvent process in a selective two-column configuration to remove the $H_2S$ as a dilute stream in co-absorbed $CO_2$, referred to as an acid gas. This dilute (in $H_2S$) acid gas stream has a low $H_2S$ concentration for most gasification feedstocks due to the insufficient selectivity of SELEXOL for removing $H_2S$ in a stream containing larger amounts of $CO_2$. This necessitates flow schemes with $H_2S$ concentrator columns and pre-loading the solvent with $CO_2$ to enable the use of the inexpensive Claus-type acid-gas cleanup approach.

SUMMARY OF THE INVENTION

The invention disclosed herein is a process and system for reducing the level of sulfur in sulfur-containing gaseous streams using a plurality of stages employing UCRSP reactor vessels to produce product gas streams having less than about 50 ppbv sulfur. Typically, the gaseous streams are derived from gasification of a feedstock selected from the group consisting of coal, petroleum coke, biomass, and combinations thereof and/or combustion of a sulfur-laden fuel. In a preferred embodiment, the gaseous stream, containing $H_2S$, is provided to a first stage UCSRP reactor vessel operating in an excess $SO_2$ mode in which an effluent gas having a reduced amount of $SO_2$ is produced with no residual $H_2S$. The effluent gas from the first stage UCSRP reactor vessel is provided to a second stage UCSRP reactor vessel, which vessel is operating in an excess $H_2S$ mode, resulting in a product gas having a relatively low amount of $H_2S$ with no residual $SO_2$.

For IGCC-type applications for generation of electricity using coal-derived syngas, this invention offers several benefits including a lower cost process than current technology. In a two stage UCSRP process, the operation of the first stage in the "excess $SO_2$ mode" to treat a major fraction of the raw feed gas ensures minimization of the solvent recirculation rate for the first absorber/reactor as the solubility of $SO_2$ in DGM or DEG is significantly higher than that of $H_2S$. The use of a second stage UCSRP reactor vessel, operated in the excess $H_2S$ mode, to treat the mixture of the effluent from the first stage plus the remainder of the raw feed gas eliminates the use of several UCSRP reactor vessels operated in the excess $H_2S$ mode only, or any other sulfur removal technology for achieving a $H_2S$ (+COS) level of about 4-10 ppmv $H_2S$ (or less) so that the product gas can be processed in a combined cycle power plant that has to meet stringent $SO_2$ emission targets (e.g., <2.4 lb/day/MWe net power produced). The availability of additional $CO_2$ mass flow to the gas turbine or chemical plant resulting in additional power or chemicals production to the extent the $CO_2$ can be used therein (such as in methanol synthesis). $CO_2$ in excess of that desired in chemical synthesis applications may be removed using a non-selective solvent chosen to minimize costs as appropriate to the conditions of the gas prevailing downstream of the present process, as known to those skilled in the art. Such $CO_2$ may be vented to the atmosphere or captured at such conditions and purity as to be saleable to a $CO_2$ pipeline or injected into a geologic formation directly after compression and liquefaction.

For special applications, such as production of chemicals or liquid fuels from coal-derived syngas where the final product gas should have ultra-low sulfur content of less than about 50 ppbv, a COS hydrolysis reactor may be added after the first reactor stage, operated under excess $SO_2$ mode, to convert COS to $H_2S$ and $CO_2$ and the effluent therefrom may be further processed in a second (or second plus third) UCSRP reactor vessel operated under the "excess $H_2S$ mode" only to reduce the $H_2S$ level to less than 4-5 ppmv so that the product syngas may be processed in a sulfur guard-bed for further reducing the $H_2S$ level to below 50 ppbv at a minimal overall cost. Similar advantages may be achieved for processing (1) natural gas or biomass/pet-coke derived syngas containing relatively high levels of $H_2S$ and (2) $SO_2$ laden flue gas from conventional pulverized coal fired power plants.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
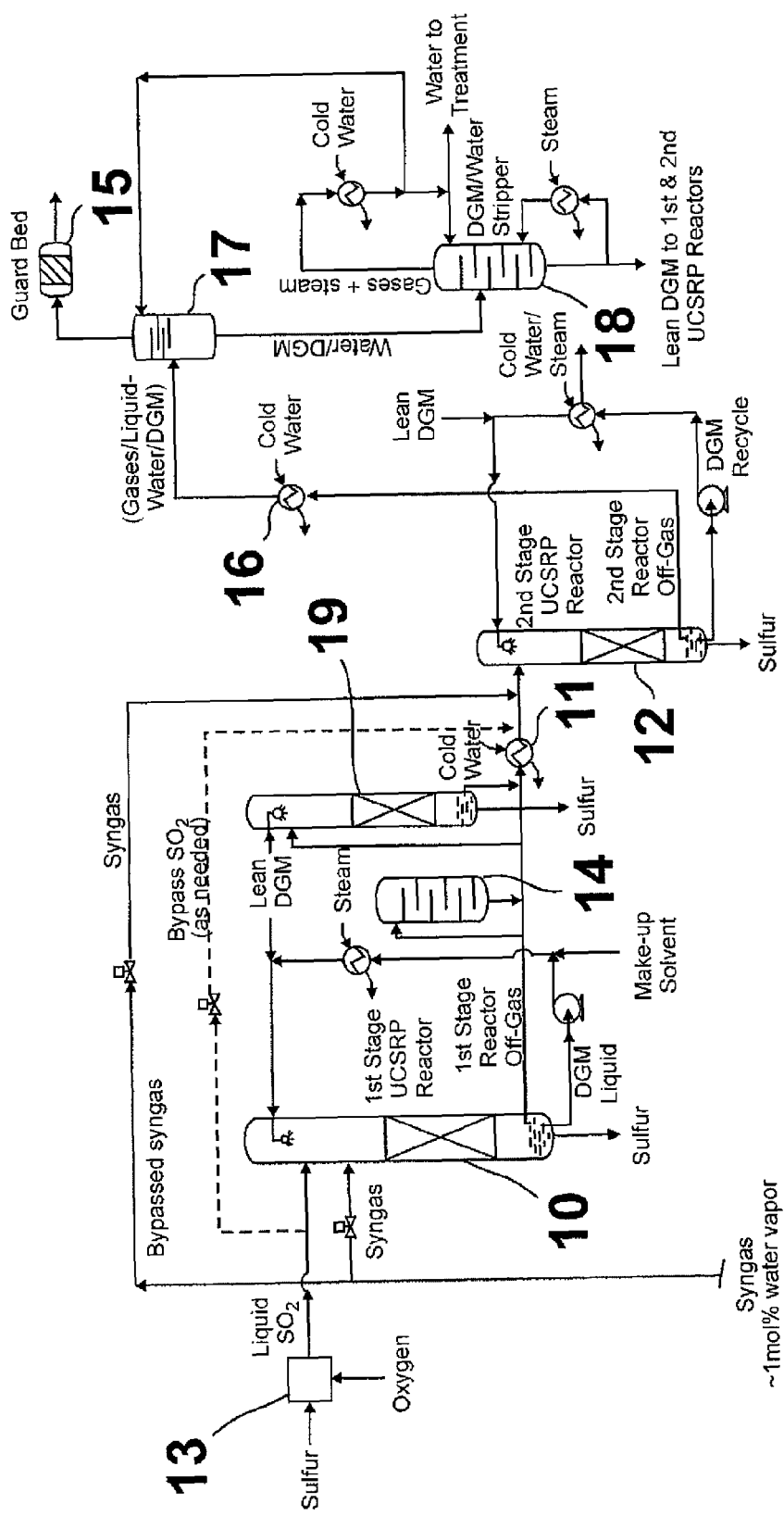
FIG. 1 is a schematic diagram of a two-stage UCSRP process for sulfur removal in accordance with one embodiment of this invention.

FIG. 1 is a schematic diagram of a system in accordance with one embodiment of this invention for performing the process in accordance with one embodiment of this invention. In the process for removal of sulfur from a gaseous stream in accordance with one embodiment of this invention, a gaseous stream containing $H_2S$, such as a synthesis gas from an upstream process, and having no more than about 1 mol % water vapor, is provided to a first stage UCSRP reactor vessel 10 operating in an excess $SO_2$ mode, producing three primary process output streams, an effluent gas having a relatively low level of $SO_2$, e.g., about 40-50 ppmv, referred to in FIG. 1 as a first stage reactor off-gas, sulfur, and liquid solvent. In the embodiment shown in FIG. 1, the solvent is DGM. The first stage effluent gas is cooled in a heat exchanger 11 and subsequently provided to a second stage UCSRP reactor vessel 12 operating in an excess $H_2S$ mode, producing a product gas, referred to in FIG. 1 as a second stage reactor off-gas, having a relatively low level of $H_2S$, typically less than about 10 ppmv, and providing additional sulfur. In accordance with one embodiment of this invention, a portion of the sulfur produced in at least one of the first stage and second stage UCSRP reactor vessels is provided to a furnace 13 together with oxygen to generate a flow of $SO_2$ which is provided to the first stage USCRP reactor vessel. The UCSRP reactor vessels, which contain a suitable packing material, may be operated either in a co-current down-flow mode or a counter-current mode. In accordance with one embodiment, a $SO_2$ flow bypassing the first stage UCSRP reactor vessel may be used to control the $H_2S$ product leaving the second stage UCSRP reactor vessel.

It is possible that some COS may form in the first stage UCSRP reactor vessel (which could typically correspond to about 4-8 ppmv or less if the $SO_2$ level in the effluent gas is about 40 ppmv). Accordingly, depending upon the COS level in the effluent gas from the first stage UCSRP reactor vessel, in accordance with one embodiment of this invention, the effluent gas is treated in a COS hydrolysis reactor 14, converting a fraction (dictated by the equilibrium of the hydrolysis reaction at the reactor outlet conditions) of the COS and water vapor to $CO_2$ and $H_2S$.

In accordance with one embodiment of this invention, a portion of the syngas from the upstream process is mixed with the effluent gas from the first stage UCSRP reactor vessel or, if needed, the product gas from the COS hydrolysis step, producing a syngas/effluent gas mixture which is provided to the second stage UCSRP reactor vessel. The amount of syngas bypassing the first stage UCSRP reactor vessel is variable, depending upon the syngas composition and syngas pressure, and depending upon the need for sulfur removal for downstream processes, e.g., for power generation or for the production of chemicals and clean fuels.

For specific applications having very stringent sulfur specifications (typically less than about 50 ppbv), such as reformed natural gas or coal gasification with the conversion of syngas to clean liquid fuels or chemicals, in accordance with one embodiment of this invention, an additional (intermediate) UCSRP reactor vessel 19 operating in an excess $H_2S$ mode (along with a COS hydrolysis reactor after processing of the syngas in the first stage UCSRP reactor vessel, if needed) is provided to reduce the $H_2S$ level to below 1-3 ppmv to minimize the net cost (capital as well as annual operating cost) of a downstream sulfur scavenger unit. Alternatively, in accordance with another embodiment of this invention, a zinc oxide guard bed 15 is provided to reduce the $H_2S$ level to below 50 ppvb as specified.

In accordance with one embodiment of this invention, the product gas from the second stage UCSRP reactor vessel is cooled in a cooler 16 in preparation of a high pressure separation step in a suitable separator vessel 17 to recover major fractions of the solvent and water present in the product gas. The liquids from the separator are processed in a suitable unit, such as DGM/water stripper 18, to recover the solvent for recycle to at least one of the first stage UCSRP reactor vessel and the second stage UCSRP reactor vessel and to remove most of the water present in the initial syngas plus the water generated from the sulfur formation reaction.

The method and system of this invention may be applied to conventional power plants using pulverized coal to achieve very low levels of $SO_2$ in the exhaust flue gas by reacting the flue gas with specific quantities of $H_2S$ generated at the power plant site (e.g., by importing hydrogen or generating hydrogen via methanol reforming and reacting it with a part of the sulfur formed).

Figure 2:
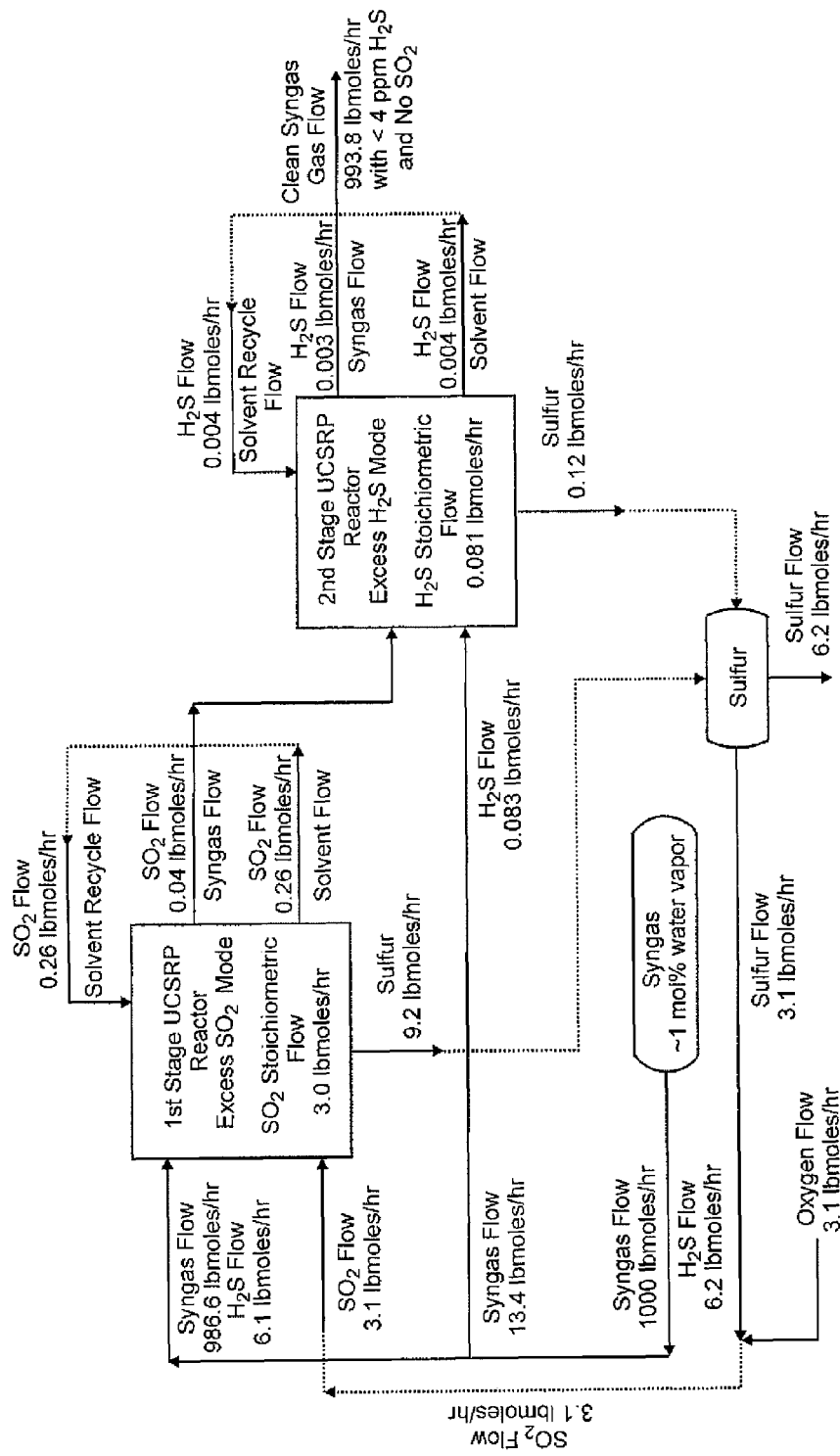
FIG. 2 is a schematic diagram showing sulfur flow for the two-stage UCSRP process in accordance with one embodiment of this invention.

By way of example, FIG. 2 shows a sulfur flow diagram for a two-stage UCSRP process for IGCC applications in accordance with one embodiment of this invention derived from a HYSYS® simulation.

It will be understood by those skilled in the art that reversing the order of the stages of the process of this invention does not produce the results of the claimed invention. That is, a process in which the first stage UCSRP reactor vessel is operated in an excess $H_2S$ mode and the second stage UCSRP reactor vessel is operated in an excess $SO_2$ mode will require a substantial number, for example, of conventional $SO_2$ scrubbing stages, with high lime recirculation, to achieve the low levels, i.e. less than or equal to about 50 ppbv $SO_2$ in the product gas, provided by the process of this invention.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A process for removal of sulfur from a $H_2S$-containing gaseous stream comprising the steps of:
   processing a gaseous stream containing a first amount of $H_2S$ in a first stage UCSRP reactor vessel operating in an excess $SO_2$ mode at a first amount of $SO_2$, producing elemental sulfur and an effluent gas having a reduced amount of said $SO_2$; and processing said effluent gas in a second stage UCSRP reactor vessel operating in an excess $H_2S$ mode, producing a product gas having an amount of said $H_2S$ less than said first amount of $H_2S$.

2. The process of claim 1, wherein said effluent gas is processed in an intervening UCSRP reactor vessel operating in an excess $H_2S$-mode prior to being processed in said second stage UCSRP reactor vessel.

3. The process of claim 1, wherein said effluent gas is treated in a COS hydrolysis reactor prior to being processed in said second stage UCSRP reactor vessel, wherein a portion of COS and water vapor present in said effluent gas is converted to $CO_2$ and $H_2S$.

4. The process of claim 1, wherein solvent and water present in said product gas are separated from said product gas, producing a liquid comprising said solvent and said water.

5. The process of claim 1, wherein an amount of said $H_2S$ in said product gas is less than about 10 ppmv.

6. The process of claim 1, wherein a portion of said gaseous stream is provided to said second stage UCSRP reactor vessel together with said effluent gas.

7. The process of claim 4, wherein said solvent is separated from said liquid and recycled to at least one of said first stage UCSRP reactor vessel and said second stage UCSRP reactor vessel.

8. The process of claim 1, wherein said gaseous stream is derived from one of gasification of a feedstock selected from the group consisting of coal, petroleum coke, biomass, and combinations thereof and combustion of a sulfur-laden fuel.

9. A system for removal of sulfur from a sulfur-containing gaseous stream comprising:
   a first stage UCSRP reactor vessel adapted to operate in an excess $SO_2$ mode having a raw feed gas inlet and a first stage product gas outlet; and
   a second stage UCSRP reactor vessel adapted to operate in an excess $H_2S$ mode having a first stage product gas inlet in fluid communication with said first stage product gas outlet and having a second stage product gas outlet.

10. The system of claim 9 further comprising an intermediate UCSRP reactor vessel adapted to operate in an excess $H_2S$ mode having an intermediate first stage product gas inlet in fluid communication with said first stage product gas outlet and having an intermediate first stage product gas outlet in fluid communication with said first stage product gas inlet.

11. The system of claim 9 further comprising a COS hydrolysis reactor for processing a first stage product gas produced in said first stage UCSRP reactor vessel prior to being processed in said second stage UCSRP reactor vessel.

12. The system of claim 9 further comprising a separator vessel adapted to separate solvent and water from a second stage product gas produced in said second stage UCSRP reactor vessel.

13. The system of claim 12 further comprising a solvent stripper vessel adapted to separate said solvent from a liquid stream containing said solvent and said water generated in said separator vessel.

14. The system of claim 13 further comprising a solvent recycle conduit for recycling said solvent separated from said liquid stream to at least one of said first stage UCSRP reactor vessel and said second stage UCSRP reactor vessel.

15. The system of claim 9 further comprising a bypass conduit for providing a portion of said gaseous stream directly to said second stage UCSRP reactor vessel.

16. The system of claim 9 further comprising a supplemental $SO_2$ conduit for providing supplemental $SO_2$ directly to said second stage UCSRP reactor vessel.

17. The system of claim 13 further comprising water recycle means for condensing steam generated in said solvent stripper vessel to produce water condensate and recycling said water condensate to said separator vessel.

18. The system of claim 12 further comprising an absorbent bed adapted to reduce an amount of $H_2S$ in said second stage product gas following separation of said solvent and said water to an $H_2S$ level less than about 50 ppbv.

\* \* \* \* \*